(12) United States Patent
Peisakhov et al.

(10) Patent No.: US 12,105,978 B2
(45) Date of Patent: Oct. 1, 2024

(54) MEMORY PARTITIONED DATA STORAGE DEVICE

(71) Applicant: Western Digital Technologies, Inc., San Jose, CA (US)

(72) Inventors: Nataniel Peisakhov, Petah Tikva (IL); Natan Tabachnik, Irus (IL)

( * ) Notice: Subject to any disclaimer, the term of this patent is extended or adjusted under 35 U.S.C. 154(b) by 30 days.

(21) Appl. No.: 17/849,702

(22) Filed: Jun. 27, 2022

(65) Prior Publication Data

US 2023/0418498 A1 Dec. 28, 2023

(51) Int. Cl.
*G06F 3/06* (2006.01)

(52) U.S. Cl.
CPC .......... *G06F 3/0644* (2013.01); *G06F 3/0607* (2013.01); *G06F 3/0635* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,370,166 B1 | 5/2008 | Ramesh et al. | |
| 7,529,881 B2 * | 5/2009 | Pascucci | G11C 16/08 711/103 |
| 8,120,990 B2 | 2/2012 | Kim | |
| 10,713,205 B2 * | 7/2020 | Nevalainen | G06F 21/85 |
| 10,868,679 B1 * | 12/2020 | Van Antwerpen | G06F 21/575 |
| 2012/0099219 A1 | 4/2012 | Al-Azzawi | |
| 2018/0239912 A1 * | 8/2018 | Welch | G06F 21/604 |
| 2019/0278502 A1 * | 9/2019 | Kanno | G06F 3/0688 |
| 2020/0241747 A1 * | 7/2020 | Gupta | G06F 21/62 |
| 2021/0165599 A1 * | 6/2021 | Ju | G06F 3/0637 |
| 2021/0389884 A1 * | 12/2021 | Sundararaman | G06F 3/0637 |

OTHER PUBLICATIONS

Stackexchange, Throttling failed login attempts: exponential timeout? by IP? using a session cookie? Captcha?, Nov. 22, 2012, https://security.stackexchange.com/questions/24287/throttling-failed-login-attempts-exponential-timeout-by-ip-using-a-session-co (Year: 2012).*

(Continued)

*Primary Examiner* — Khoa D Doan
*Assistant Examiner* — Edmund H Kwong
(74) *Attorney, Agent, or Firm* — PATENT LAW WORKS LLP

(57) ABSTRACT

A data storage device comprising a non-volatile storage medium configured to store user data, where the storage medium is organized as one or more partitions, including at least one secure partition. The partitions are defined by a corresponding set of pre-specified physical memory blocks of the storage medium. The data storage device also includes a data path configured to provide data communication between a host computer system and the storage medium of the data storage device. A partition controller of the data storage device is coupled to a switch. In response to an actuation of the switch, the partition controller is configured to cause the data storage device to selectively transition between: a secure mode in which the set of physical memory blocks of each secure partition is connected to the host via the data path; and a non-secure mode in which the set of physical memory blocks of each secure partition is disconnected from the host via the data path.

20 Claims, 10 Drawing Sheets

(56) References Cited

OTHER PUBLICATIONS

Kioxia, Why Replace Embedded NOR Flash Memory with Serial NAND? Technical Brief, Mar. 2021, https://americas.kioxia.com/content/dam/kioxia/en-us/business/memory/slc-nand/asset/KIOXIA_NOR_to_NAND_Tech_Brief.pdf (Year: 2021).*

K. Missimer & R. West, "Partitioned Real-Time NAND Flash Storage", Retrieved online, http://www.cs.bu.edu/~richwest/papers/rt_nand_rtss2018.pdf, accessed on Feb. 24, 2022.

* cited by examiner

MEMORY PARTITIONED DATA STORAGE DEVICE

TECHNICAL FIELD

This disclosure relates to a data storage device (DSD) that selectively controls the accessibility of one or more partitions of the memory space defined by a storage medium of the DSD to a host computing system.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the drive as a block data storage device such that a user of the device may access the storage of the drive via the data path (e.g., through operation of the host computer). Access to the drive typically enables a user to access (e.g., read, write and/or modify) user data content stored on the drive.

Some DSDs are configured for use in environments where is a need to protect the data stored on the storage component. For example, the data stored within a DSD may be vulnerable to malicious activity in the form of alterations, additions, and deletions and from access by an unauthorized user. These malicious activities may be conducted by processes executing on the host computing system, often without user knowledge (termed "malware"), or, in some cases, on the DSD itself, such as within the internal memory of the device controller.

Prior approaches to securing DSDs against malicious activity include controlling the types of activities and operations that may be performed on the data stored in the storage component. Some DSDs implement software and/or hardware mechanisms to allocate the memory as "read-only", where the data presently stored in the memory can be accessed (i.e. read) but not altered or added to. Although this provides protection against the deletion and modification of stored data, and the storage of unwanted or unauthorized new data into the memory, read-only security approaches do not protect an unauthorized user from obtaining copies of the stored data.

Some devices are configured to store data in an obscured form, such as an encrypted or encoded representation of some source data that is desired to be kept confidential. However, as read-only memory protections do not prevent an unauthorized user from reading the stored data, the unauthorized user may still obtain a copy of the data as stored and launch attacks against the copy in an attempt to break the encryption or encoding (i.e., to recover the source data). Furthermore, operating a DSD in a read-only mode may be inconvenient for a user that needs the ability to store new data into, and modify existing stored data on, the memory of the device (e.g., since the user needs to toggle the device to and from write-permitted modes prior to performing the desired data access operations).

Logical control mechanisms have been implemented in an attempt to secure the data stored in a DSD against unauthorized access or malicious activity while maintaining an ability to read and write to the memory of the device. For example, the operating system of the host computing system can be configured to implement a system of permissions that restricts the read and write operations that are performable on the stored data based on the properties of the requesting user. However, using this type of permission system to achieve data security for small-scale DSDs, such as flash drives, is problematic since these DSDs are often used to store data from multiple hosts, each potentially having their own sets of user permissions.

SUMMARY

Disclosed herein is a data storage device comprising: a non-volatile storage medium configured to store user data, wherein the storage medium is organized as one or more partitions, the partitions including at least one secure partition, and wherein each of the one or more partitions is defined by a corresponding set of pre-specified physical memory blocks of the storage medium; a data path configured to provide data communication between a host computer system and the storage medium of the data storage device; a switch; and a partition controller coupled to the switch of the data storage device, the partition controller configured to, in response to an actuation of the switch, cause the data storage device to selectively transition between: a secure mode in which the set of physical memory blocks of each secure partition is connected to the host via the data path; and a non-secure mode in which the set of physical memory blocks of each secure partition is disconnected from the host via the data path.

In some embodiments the partition controller comprises: one or more block control modules (BCMs); and a block selector, wherein each BCM provides data communication between the set of physical memory blocks of an associated partition of the one or more partitions and the data path, and wherein the block selector is configured to selectively enable one or more of the BCMs, such that the associated partition of each BCM is connected to the data path only when the BCM is enabled.

In some embodiments, each set of physical memory blocks includes one or more NAND flash memory blocks, each BCM is a Flash Interface Module (FIM), and the block selector is a FIM selector.

In some embodiments, the one or more partitions of the storage medium include at least one non-secure partition, and wherein in response to the data storage device transitioning to the non-secure mode, the set of physical memory blocks of each non-secure partition is connected to the host via the data path.

In some embodiments, in response to the data storage device transitioning to the secure mode, the set of physical memory blocks of each non-secure partition is disconnected from the host via the data path.

In some embodiments, the one or more partitions of the storage medium includes at least two non-secure partitions, and wherein the partition controller is configured to enable parallel access to the at least two non-secure partitions.

In some embodiments, the FIM selector is configured to process a mode operation signal to determine one or more FIMs to enable, wherein the mode operation signal indicates the secure mode or the non-secure mode of the device.

In some embodiments, the actuation of the switch involves moving the switch between a first position and a second position, wherein the movement of the switch causes the mode operation signal to toggle between a signal indicating the secure mode and a signal indicating the non-secure mode.

In some embodiments, the device is configured to: prevent any selective transition to the secure mode in response to the device assuming a locked state; and enable any selective transition to the secure mode in response to the device assuming an unlocked state.

In some embodiments, the device is configured to enable or prevent any selective transition to the secure mode by respectively enabling or disabling the actuation of the switch.

In some embodiments, the data storage device further includes: one or more input components configured to receive authentication input from the user; and a device controller configured to process the authentication input and to provide an indication of whether the user is an authorized user of the device, and wherein the device assumes the unlocked state only in response to the authentication of the user as an authorized user of the device.

In some embodiments, the data storage device further comprises a cryptography engine logically connected between the data port and the storage medium, and wherein the device controller is further configured to: following the selective transition of the data storage device to the secure mode, instruct the cryptography engine to use a decryption key to perform a decryption function to selectively decrypt encrypted user data stored on the at least one secure partition of the storage medium.

In some embodiments, the device controller is configured to respond to a request by a user to access user content data stored on the at least one secure partition of the storage medium by: receiving the decryption key from a user via the host computer system; determining whether the received decryption key matches to a private key of the data storage device; and performing the decryption function only in response to a match between the received decryption key and the private key of the data storage device.

In some embodiments, in response to determining that the received decryption key does not match to the private key of the data storage device, the device controller is configured to: log the request by the user to access the user content data stored on the at least one secure partition as an invalid data access request; determine a number of invalid data access requests logged by the device controller over an access time interval; and in response to the number of invalid data access requests exceeding a threshold value, selectively ignore further requests to access the user content data stored on the at least one secure partition of the storage medium, until the occurrence of one or more access control events.

In some embodiments, the one or more access control events include the lapsing of a timeout period, the period commencing at the time when the number of invalid data access requests exceed the threshold value and having a pre-specified duration.

In some embodiments, the device controller is further configured to respond to a request by a user to store selected user content data on the at least one secure partition of the storage medium by: instructing the cryptography engine to use an encryption key to perform an encryption function to encrypt the selected user content data, and store the encrypted selected user content data on at least one secure partition of the storage medium.

In some embodiments, the encryption key is the private key of the data storage device.

Disclosed herein is a method for securing user content data of a data storage device, the method executed by a controller of the device and comprising: (i) determining an actuation of a switch of the data storage device; (ii) in response to the actuation of the switch, causing a transition of the data storage device between: a secure mode; and a non-secure mode, wherein the user content data is stored within a non-volatile storage medium of the data storage device, the storage medium organized as one or more partitions including at least one secure partition, and wherein each of the one or more partitions is defined by a corresponding set of pre-specified physical memory blocks of the storage medium, and wherein: in the secure mode, the set of physical memory blocks of each secure partition is connected to the host via a data path providing data communication between a host computer system and the storage medium of the data storage device; and in the non-secure mode, the set of physical memory blocks of each secure partition is disconnected from the host via the data path.

In some embodiments, the method further comprises: in response to selectively transitioning the data storage device to the secure mode, responding to a request by a user to access user content data stored on the at least one secure partition of the storage medium by: receiving a decryption key from the user via the host computer system; determining whether the received decryption key matches to a private key of the data storage device; and performing the decryption function only in response to a match between the received decryption key and the private key of the data storage device.

Disclosed herein is a data storage device comprising: means for storing user data, wherein the means for storing data is organized as one or more partitions, the partitions including at least one secure partition, and wherein each of the one or more partitions is defined by a corresponding set of pre-specified physical memory blocks of the means for storing data; means for providing data communication between a host computer system and the means for storing user data of the data storage device; means for switching; means for selectively transitioning the data storage device between: a secure mode in which the set of physical memory blocks of each secure partition is connected to the host via the means for providing data communication; and a non-secure mode in which the set of physical memory blocks of each secure partition is disconnected from the host via the means for providing data communication, wherein the selective transitioning of the data storage device occurs in response to an actuation of the means for switching.

BRIEF DESCRIPTION OF DRAWINGS

Some embodiments are described herein below with reference to the accompanying drawings, wherein.

DESCRIPTION OF EMBODIMENTS

Figure 1A:
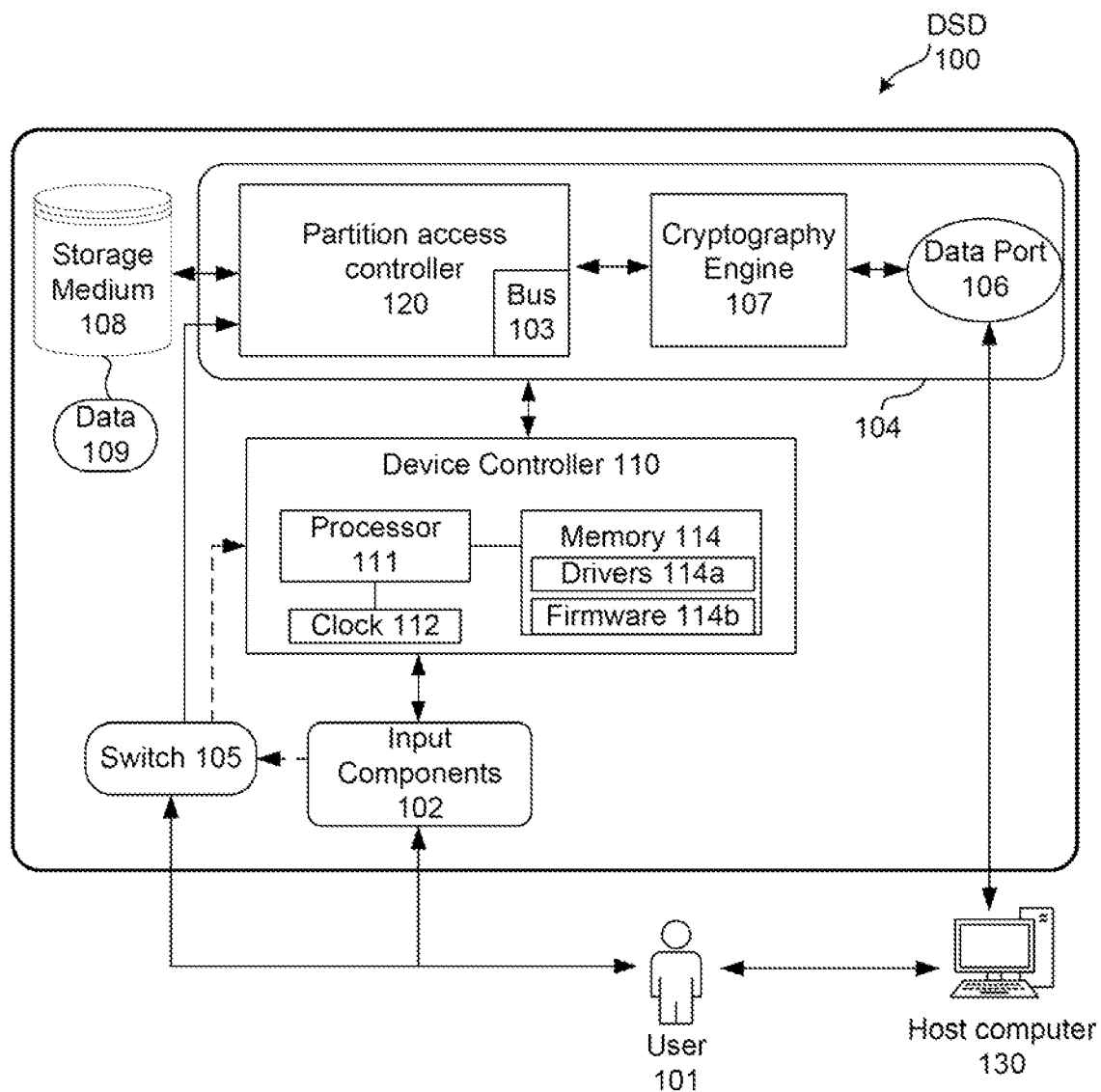
FIG. 1a illustrates an example data storage device (DSD) according to one embodiment.

Partitioning of a storage component refers to the ability to divide the storage capacity into one or more of portions or segments. Each segment has a separately addressable memory space over which logical control can be exercised by a processor or microcontroller. Specifically, the device controller of a DSD can be configured to selectively enable one or more partitions, thereby permitting read and write operations on the data stored thereon. By contrast, partitions may be selectively disabled by the operating system or DSD firmware to logically prevent a data transfer to or from the associated memory space. In this case, the memory space of the disabled partitions is hidden such that an application layer program cannot validly request to read data from, or write data to, the associated disabled memory areas.

Memory partitioning is therefore suitable to facilitate securing the user data content of a DSD against malicious activities and access by unauthorized parties (i.e., via the respective connected host). Existing approaches involve designating one or more partitions of the memory space for storing the secure data (referred to as a "secure partition"), where the DSD is configured to control access of users (via the host) to the secure partition. These approaches are based on logical control (i.e., the use of an operating system or firmware to allocate parts of the logical address space as partitions). However, there are several associated drawbacks. First, access to respective partitions is controlled at the software or firmware level. For example, the device controller may be configured to determine which particular partitions are enabled for a particular connected host computing system, and/or user of the system, based on a set of permissions.

Second, the partitions exist as logical constructs that are defined by, for example, a mapping of a portion of logical addresses to corresponding hardware addresses of the underlying memory space. However, in this type of implementation the entirety of the memory space remains physically connected to the data path of the device (i.e., the channel through which data flows between the host computing system and the storage medium). Furthermore, since the partitions are defined only at the logical level there is no ability to control or constrain the effect of the data operations (e.g., read and write commands made by the host) on the memory structures (e.g., the physical memory blocks in the case of the flash storage medium).

Consequently, existing approaches to using multiple partitions to secure data stored on a data storage device are reliant on software or program code (e.g., as maintained by the memory or firmware of the device) to define and control the accessibility of partitions. This results in a vulnerability to attacks against the software of the host, or the firmware of the device, where such attacks are designed to compromise the partition control data maintained by the device. If successful, this type of attack may permit an unauthorized user to enable and access the sensitive data stored on a secure partition, or even to modify the partition definitions (which may result in data loss or other unwanted effects). It is therefore desired to provide a data storage device that ameliorates one or more of these difficulties, or other difficulties of the prior art, or that at least provides a useful alternative.

With reference to FIG. 1a, there is disclosed an exemplary data storage device (DSD) 100 that selectively controls the accessibility of one or more partitions of a memory space of a storage medium 108 of the DSD 100 to a connected host 130. The partitions include at least one secure partition for storing particular user content data securely. Unlike in conventional storage devices that provide data security by logically enabling or disabling partitions, such as the secure partition, in the devices described herein the accessibility of logically defined partitions is controlled at the hardware level by physically connecting and disconnecting corresponding sets of memory blocks respectively to and from the host 130 via a data path 104 of the device.

The sets of memory blocks of the partitions are selectively connected or disconnected via an actuation of a switch 105 of the DSD 100, such as for example as may occur in response to an interaction between a user 101 of the device 100 and the switch 105. The switch 105 is implemented as a hardware component that is physically coupled to the device 100, such as by incorporation into a housing or outer casing of the device 100, or configured to be otherwise attached to the same. For example, the switch 105 may be implemented as a push-button, slider, knob, or other device which is activated or actuated by the user 101.

The use of the terms "connected" and "disconnected" in relation to the partition(s) of the medium 108 refers to a hardware level coupling of the associated set of memory blocks to the host via the internal data transfer circuitry of the DSD 100 (i.e., the data path 104), that is enabled or disabled respectively. A set of memory blocks that is connected to the host 130 via the data path 104 is accessible to send and receive electrical signals representing data transferred to and from the DSD 100 and the host 130. A set of memory blocks that is disconnected from host 130 via the data path 104 is physically incapable of completing a data transfer to or from the host 130. The connection or disconnection of the set of physical memory blocks of a partition may also be described in shorthand as "connecting the partition" or "disconnecting the partition" respectively.

By contrast, the "enabling" and "disabling" of a partition refer to the ability of a host 130 to logically address the partition for data storage, which may be determined by a controller 110 of the device 100 (i.e., through firmware or other program code controlling the data access flow). That is, in the devices and methods described herein a partition is "accessible" only in response to the connection of the corresponding physical memory blocks to the data path, and where the appropriate data transfers are enabled by the device controller 110.

In the examples described, memory partitions of the storage medium 108 are defined by a corresponding set of pre-specified physical memory blocks. That is, one or more sets of physical memory blocks are designated to form a particular partition in hardware, unlike conventional data storage devices that maintain logically defined partitions of the medium 108. The memory block sets ("blocksets") of each partition are coupled to a partition access controller (PAC 120), which includes corresponding block control modules facilitating data path access between the respective memory blocks and a data bus 103 of the device. That is, a single block control module of the PAC 120 independently and dynamically controls the data path connection to one or more blocksets, in response to the activation or deactivation of the module by a block selector component of the PAC 120. This permits the connection and disconnection of particular memory partitions entirely in hardware and separately to the function of the device controller 110 (i.e., which provides the functionality to logically enable and disable (connected) partitions to the host 130).

The selective connection or disconnection of the secure partition(s) is respectively associated with a secure mode of operation and a non-secure mode of operation of the DSD 100. The operation of the hardware switch (e.g., in response to an actuation by the user 101) causes the DSD 100 to selectively transition between the secure mode, in which the set of physical memory blocks of each secure partition is connected to the host 130 via the data path 104, and the non-secure mode, in which the set of physical memory blocks of each secure partition is disconnected from the host 130 via the data path 104.

In some embodiments, the ability to cause a transition to the secure mode via the operation or actuation of the switch 105 requires the validation of the user 101 as an authorized user of the device 100, such as for example, by the use of a verification input, such as a PIN or biometric identifier. This is advantageous in providing protection against theft, or other forms of physical misappropriation of the device 100, by an attacker.

In some embodiments, the user content data stored on the secure partition (the "secure user content data") is logically protected by encryption or encoding. For example, the data storage device 100 may be configured to include a cryptography engine 107 configured to perform encryption and decryption functions to selectively encrypt and decrypt user content data that is, or is to be, stored on the at least one secure partition of the storage medium 108. In some implementations, encryption and decryption functions are performed "on the fly" with keys provided in real-time, and without requiring the storage of the same within the internal storage of the DSD 100. Accessing the secure user content data is therefore a two-stage process requiring (i) activating the secure partition(s) by actuation of the physical switch, causing the DSD 100 to transition to the secure mode (i.e. to connect the corresponding blocksets of the secure partition(s)); and (ii) decrypting the secure user content data that is accessible from the secure partition (e.g., by engaging the cryptography engine 107 to operate with a particular decryption key).

The use of a hardware switching mechanism to selectively connect and disconnect sets of memory blocks corresponding to secure and non-secure partitions to and from the host 130 via the data path 104, as implemented by the devices described herein, provides advantages over conventional data storage devices, including: i) the ability to toggle the operational mode of the device using hardware, such that the user is able to swap between respective secure and non-secure partitions via manual interaction with the device (i.e., without requiring an exchange of data and/or control signals between the device and a connected host); ii) the ability to control data access operations performed on the individual sets of memory blocks corresponding to the secure and non-secure partitions, where the control is provided at the hardware level (i.e., by a series of block control modules) and therefore independently of the device controller and its firmware or program code; iii) the ability to physically isolate the blocksets of the secure partition(s) from the data path in the non-secure mode, such that the secure partition(s) are electrically inaccessible to the host; and iv) combining hardware based control of access to particular memory blocksets (e.g., blocks corresponding to the secure partition (s)) with logical protection of the user content data stored on the corresponding secure partition(s) (e.g., via encryption of secure user content data).

Therefore, the data storage devices described herein provide an improved solution for selectively securing stored data against unauthorized access, at least by preventing an attacker from using code based attacks (e.g., targeting the software or firmware of the device controller) to gain access to the user data stored on the secure partition, particularly when the unauthorized party is unable to physically interact with the device.

Memory Partitioned Data Storage Device

FIG. 1a shows an embodiment of the DSD 100 comprising a storage medium 108, a data path 104 for connecting the storage medium 108 to a host computing system 130, a partition access controller (PAC) 120 and a switch 105. The data path 104 provides data communication between the host 130 and the storage medium 130, and comprises a data port 106 configured to transmit data between a host computer system 130 and the DSD 100. Although the embodiment depicted in FIG. 1a shows the data path 104 as wholly encompassing the PAC 120, it will be appreciated that this is merely illustrative of the ability of one or more components of the PAC 120 to form part of the data path 104, depending on the implementation, and that it is not necessary that all components of the PAC 120 are included within the path 104.

The DSD 100 is configured to register with the host computer system 130 such as to provide functionality to the host computer system 130 of a block data storage device. The storage medium 108 is configured to store user content data 109. The user content data 109 includes one or more blocks of data organized into files, for example including images, documents, videos, etc., according to a particular file system operable by the host computer 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the user content data 109 is written in blocks to the storage medium 108 and read in blocks from the storage medium 108.

The host computer 130 is configured to include a device driver and a data/power interface for communicating with the DSD 100 and providing it with power. The data and power interface operates over data port 106, which may be implemented as, for example, some form of USB port (e.g., USB-A, USB-B, USB-C, mini-USB, micro-USB, etc.), a Thunderbolt port, a Power over Ethernet (PoE) port, or a similar port.

In some embodiments, the DSD 100 includes a cryptography engine 107 configured to receive, interpret and execute commands received from host computer system 104 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is configured to use a cryptographic key to encrypt user content data 109 to be stored on the storage medium 108, and to decrypt the encrypted user content data 109 stored on the storage medium 108 in response to a request from the host computer system 130. That is, the device controller 110 issues commands to the data path components to cause the cryptography engine 107 to control a cryptographic state of the user content data 109 (i.e., encrypted or plain). For example, the device controller 110 may provide a key to the data port 106, which the data port 106 then forwards to the cryptography engine 107 via a SECURITY SET PASSWORD command of the ATA SECURITY feature set.

In some embodiments, the cryptography engine 107 is connected between the data port 106 and the PAC 120 such that data received from, or transmitted to, the host 130 via the data port 106 passes through the engine 107 (i.e., such that the engine 107 forms part of the data path 104), as depicted in FIG. 1a. In other embodiments, the cryptography engine 107 is deployed externally to the data path 104 and is configured to intercept the relevant data as it passes through the path 104, perform the appropriate encryption or decryption operations, and re-inject the data for transmission to the host 130 via data port 106, or to the storage medium 108 via the PAC 120. In other embodiments, the DSD 100 does not include a cryptography engine 107, such that the partition access controller 120 is directly connected to the data port 106.

The described embodiments of the DSD 100 include a device controller 110 comprising: a processor 111; a clock 112 in communication with the processor 111; and a memory. 114 configured to store one or more drivers 114a and a firmware 114b. The memory 114 is configured to exchange data with the processor 111 and a power source 113 (not shown), such as an internal battery, configured to power, at least, the processor 111 and the clock 112. The firmware 114b and drivers 114a may be stored in a separately partitioned area of system memory 114, or in one or more dedicated hardware modules, such as caches, registers, or a combination of these.

The processor 111 is configured to execute program code stored within the system memory 114 to issue commands for controlling the operation of the DSD 100. The function of the processor 111 includes, but is not limited to, generating: data representing an operational mode of the device 100 (i.e., whether the device 100 is in the secure mode or the non-secure mode); data representing an access state of the device 100 (i.e., whether the device 100 permits transitions between the secure mode or the non-secure mode); signals, to control data transmission through data path 104; and control signals to direct the encryption or decryption of the user content data 109 by cryptography engine 107; and, in some embodiments, control signals to control the operation of other components of the DSD 100 such as the, switch 105 (i.e., to enable or disable actuation of the switch 105), and PAC 120 and/or its sub-components.

In some embodiments, processor 111 generates and transmits user interface (UI) control signals to one or more input components 102 to manage one or more UI elements of the components (e.g., LEDs associated with the keypad and buttons). Processor 111 receives a clocking signal from clock 112, which is processed to produce timestamp values representing instants in real-time that are used by the device controller 110 (e.g., by the user authentication process).

The system memory 114 stores device specific data, including at least a unique identifier of the DSD 100, referred to as the device identity key (IDK), and an indication of the operational mode of the DSD 100. For example, the operational mode may be represented by a binary data access variable having values '0' or '1' representing the "secure" and "non-secure" modes of the device 100 respectively. In some embodiments, the system memory 114 stores also stores an indication of the access state of the DSD 100, for example as a binary value.

In embodiments where an authentication process is performed to change the access state of the DSD 100, as described below, the system memory 114 is configured to store authentication data of the device 100. For example, the authentication data may include unlock passcode data representing the unlock passcode for unlocking the DSD 100, and any other data required by the device 100 to perform user authentication.

In some embodiments, the data storage device 100 includes one or more input components 102 configured to accept an input from the user 101. For example, the input components 102 may include a: set of buttons; and a keypad, or a similar arrangement of mechanical components that collectively enable the selection of digits or characters for entering into the device 100. The input components 102 may also include one or more communications components configured to receive data wirelessly, such as a Near Field Communication (NFC) or Radio-frequency identification (RFID) reader.

In exemplary implementations, the input components 102 are configured to receive to receive authentication input from the user 101, such as a password, a personal identification code or number (e.g., a PIN) or similar authentication value from the user 101. In some embodiments, the input components 102 include a biometric authentication device, such as, for example, a fingerprint reader configured to accept a biometric input (e.g., an indication of a fingerprint pattern) from the user 101.

The user 101 operates the input components 102 to change the access state of the device 100. For example, the user 101 may enter a passcode or PIN into the DSD 100 via the input components 102. The device controller 110 is configured to subsequently determine whether the user is an authorized user of the device 100, and if so thereby enable the device 100 to assume the unlocked state (i.e., so that the user 101 may alter the operational mode).

Hardware Switch for Partition Control

Figure 1B:
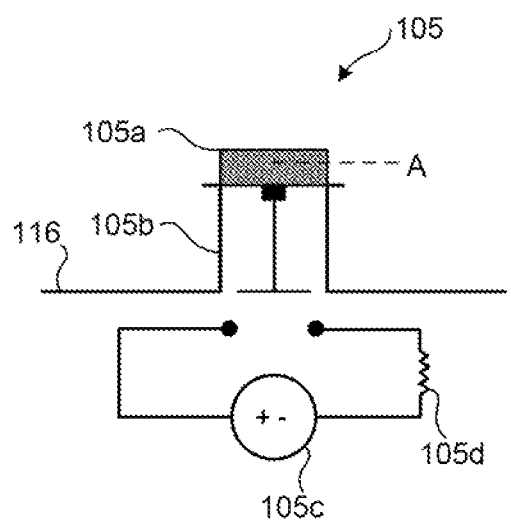
FIG. 1b illustrates an exemplary switch in an elevated position of the example DSD in accordance with some embodiments.
Figure 1C:
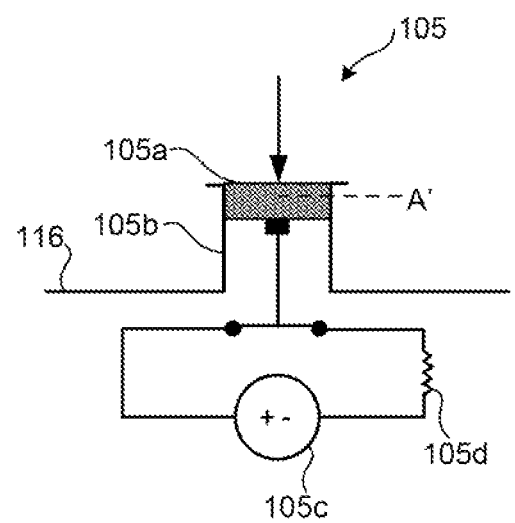
FIG. 1c illustrates an exemplary switch in a depressed position of the example DSD in accordance with some embodiments.

Switch 105 is a hardware device enabling a manual interaction between the DSD 100 and the user 101 operating the device 100. Interaction between the user 101 and the switch 105 results in an actuation of the switch 105, in which the switch moves between a first position and a second position. FIGS. 1b and 1c illustrate an exemplary switch 105 implemented as a button switch including a housing 105b and a cap 105a disposed within the housing 105b. In the absence of manual interaction with the user, as shown in FIG. 1b the cap 105a resides in an elevated position A within the housing 105b. The user 101 actuates the switch 105 by exerting a force onto the cap 105a (e.g., via pressing on to the cap with a finger), causing the cap 105a to move into a depressed position A' (as shown in FIG. 1c).

In the described embodiments, the actuation of the switch 105 causes the generation of a mode operation signal. The mode operation signal toggles between a signal indicating the secure mode, and a signal indicating the non-secure mode. In the described embodiments, actuation of the switch 105 results in the generation of a mode operation signal that is received by the partition access controller 120. The actuation of the switch 105 therefore permits the user 101 to control the whether the device operates in the secure mode or the non-secure mode (i.e., via the generation of the mode operation signal) independently to, and without the need for, any data exchange between the DSD 100 and an external device (such as host 130).

In some embodiments, the mode operation signal is generated by control circuitry of the switch 105. For example, in the embodiments depicted in FIGS. 1b and 1c the button switch 105 is configured to cause the opening and closing of an electrical circuit, including a voltage element 105c and a resistive element 105d. The mode operation signal is generated over the resistive element 105d and toggles between a high value voltage or current value (e.g., '1') and a low value voltage or current value (e.g., '0'). The PAC 120 receives the mode operation signal via a direct connection of the electrical circuit to one or more components of the PAC 120.

In other embodiments, the switch 105 is connected to the device controller 110. In such embodiments, the processor 111 of the device controller 110 may be configured to detect an actuation of the switch 105, to generate the mode operational signal in response, and to subsequently provide the generated mode operation signal to the PAC 120.

Physical Connection and Disconnection of Partition Memory Blocksets

The PAC 120 is configured to dynamically adjust the path for data communication between the host 130 and the pre-specified memory blocks of the secure partition based on whether the device 100 is operating in the secure or non-secure mode. In some embodiments, the partition access controller 120 includes a bus 103 configured to transfer data and/or addresses between the data port 106 and the storage medium 108. The bus 103 comprises one or more lines, in the form of wires or conductors, that electrically connect the components of the data path 104 enabling data to be provided to, and received from, the storage medium 108. In some embodiments, the bus 103 is a module that includes one or more individual sub-buses such as an address bus, a data bus, and/or a control bus. In other embodiments, the PAC 120 is configured to utilize one or more existing data, address, or control buses of the DSD 100, such as for example buses implemented within the device controller 110.

In the described embodiments, the hardware based partitioning of the memory space of the DSD 100 is enabled by a partition access controller (PAC) 120 that includes: one or more block control modules (BCMs); and a block selector. The PAC 120 enables the DSD 100 to independently control the connection and disconnection of pre-specified physical memory blocks to the host via the data path 104. That is, the active components of the data path 104 dynamically vary such that only particular sub-paths between a BCM and the associated physical memory blocks, and between the BCM and a data bus of the DSD 100 are activated in the respective secure and non-secure operational modes.

In the embodiments disclosed herein, the set of physical memory blocks forming the memory space of the storage medium 108 includes one or more flash memory blocks, such as NAND blocks. Other memory types may be utilized to implement the physical memory blocks, such as NOR flash blocks. In such implementations, each BCM is a Flash Interface Module (FIM), and the block selector is a FIM selector device. The FIM selector is configured to selectively enable one or more of the FIMs, such as to connect the associated partition (i.e., the corresponding set of NAND flash memory blocks) to the data path 104.

In other embodiments, the physical memory blocks may be implemented via non-NAND based storage technology. For example, in implementations in which the storage medium is a rotating magnetic disk, the physical data blocks are the one or more sectors of particular tracks of the disk. In such implementations, BCM may be a disk head controller or similar device which physically controls the ability to read and write to the sectors designated as part of the secure partition(s).

The configuration of the PAC 120, and the constituent individual FIMs 211 to 21Ns and FIM selector device 202, may vary depending on factors including the form and operation of the hardware switch, the configuration of the bus (e.g., width, data transfer rate, etc.), and any operational parameters of the PAC 120 (e.g., whether the connection and disconnection of secure and non-secure partitions is mutually exclusive). For example, in some embodiments the PAC 120 is an ASIC controller including a FIM selector implemented as a multiplexer with an input signal received from the hardware switch, and two output signals for enabling or disabling the FIMs (e.g., via the setting of a chip enable bit) of NAND blocks corresponding to respective designated secure and non-secure partitions.

Figure 2:
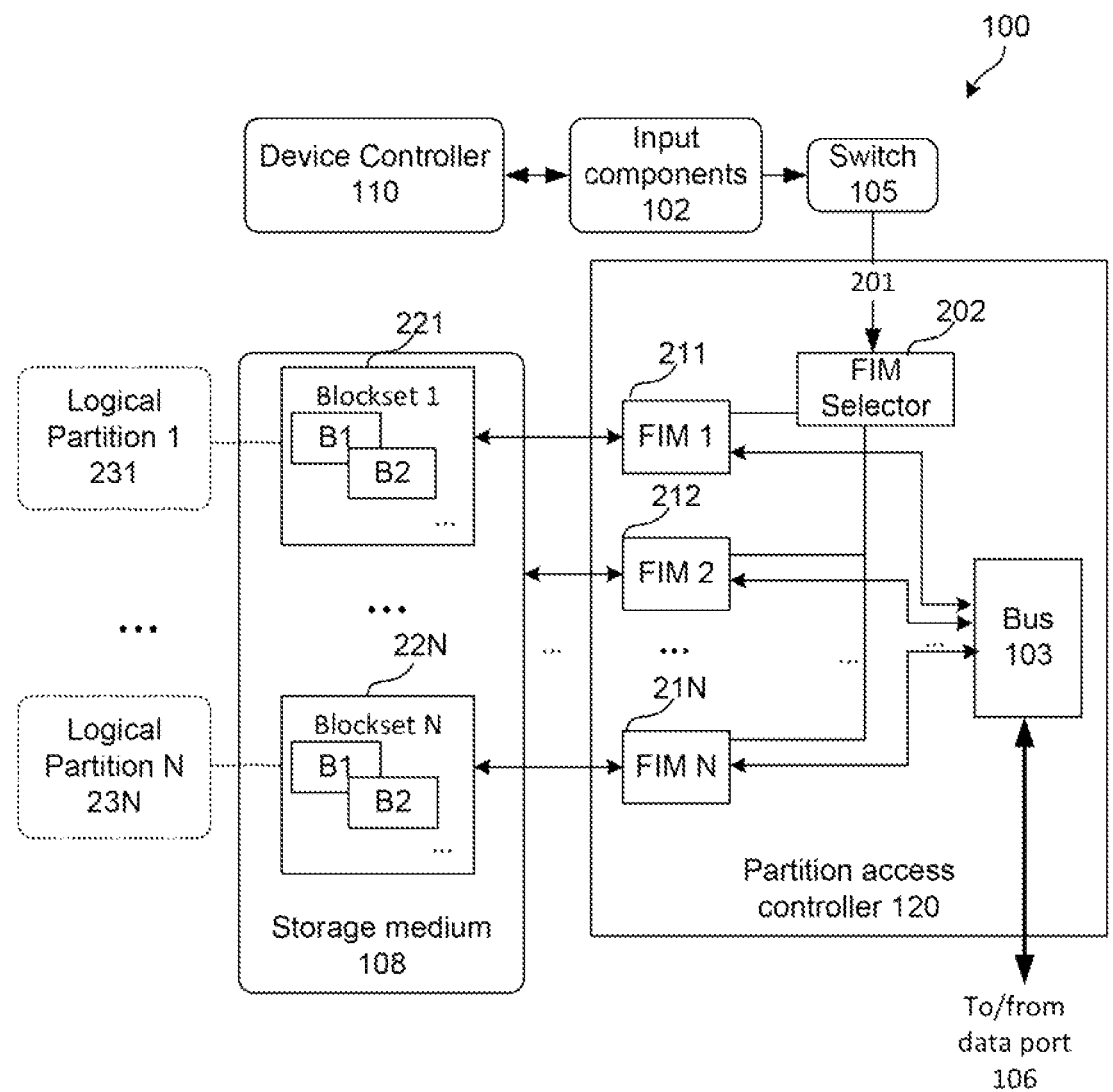
FIG. 2 illustrates a block diagram of a partition access controller and a storage medium of the example DSD in accordance with some embodiments.

FIG. 2 illustrates an exemplary embodiment of the DSD 100 in which each set of (hardware) NAND blocks B1, B2, . . . (referred to collectively as a "blockset") of the storage medium 108 is mapped to a logical partition in the form of an address space defined by a controller 110 of the DSD 100. That is, the total accessible memory space (the "memspace") of the storage medium 108 is formed from the set of partitions that are connected at any given time. As depicted in FIG. 2, PAC 120 receives a mode operational signal 201 as a result of actuation of switch 105. The mode operation signal 201 indicates either the secure mode (i.e., with a high digital signal value '1') or the non-secure mode (i.e., with a low digital signal value '0').

The mode operation signal 201 is received by the FIM selector 202 which is configured to process the signal 201 and to activate or deactivate (i.e., selectively enable) one or more of the N FIMs 211 to 21N via control lines connecting the selector 202 to each respective FIM 211 to 21N. The configuration of the control lines may be determined by the designation of particular FIMs as corresponding to blocksets forming a secure partition or a non-secure partition. For example, FIM selector 202 may be implemented as a multiplexer circuit configured to process the input signal 201 and generate two output signals to connect, via the control lines, to the FIMs of the secure partitions (e.g., FIM 1 (211)) and the FIMs of the non-secure partitions (e.g., FIM 2 (212) to FIM N (21N)).

In the configuration depicted by FIG. 2, each FIM 211 to 21N provides data communication between the blocksets of an associated partition and the data path 104. Consider logical partition 231 associated with physical blockset 1 (221) of storage medium 108. An electrical pathway exists between blockset 1 (221) and bus 103 (and therefore host 130 via data port 106) through FIM 1 (211), such that in response to the activation of FIM 1 (211) the blockset 1 (221) is connected to the host 130 via the data path 104. Analogous operations occur for causing the connection and disconnection of the other FIMs (211 to 21N) to and from the host 130 via the data path 104.

The number of total, secure, and non-secure partitions of the storage medium 108 are denoted as N, K, and M=N−K respectively. The number and type of partitions defined for the storage of data in the storage medium 108 may vary over different embodiments of the DSD 100. For example, in some implementations the DSD 100 is configured with a single secure partition (i.e., N=1, K=1) such that transitioning between the secure mode and the non-secure mode represents enabling and disabling the data transfer capability of the device 100.

Figure 3A:
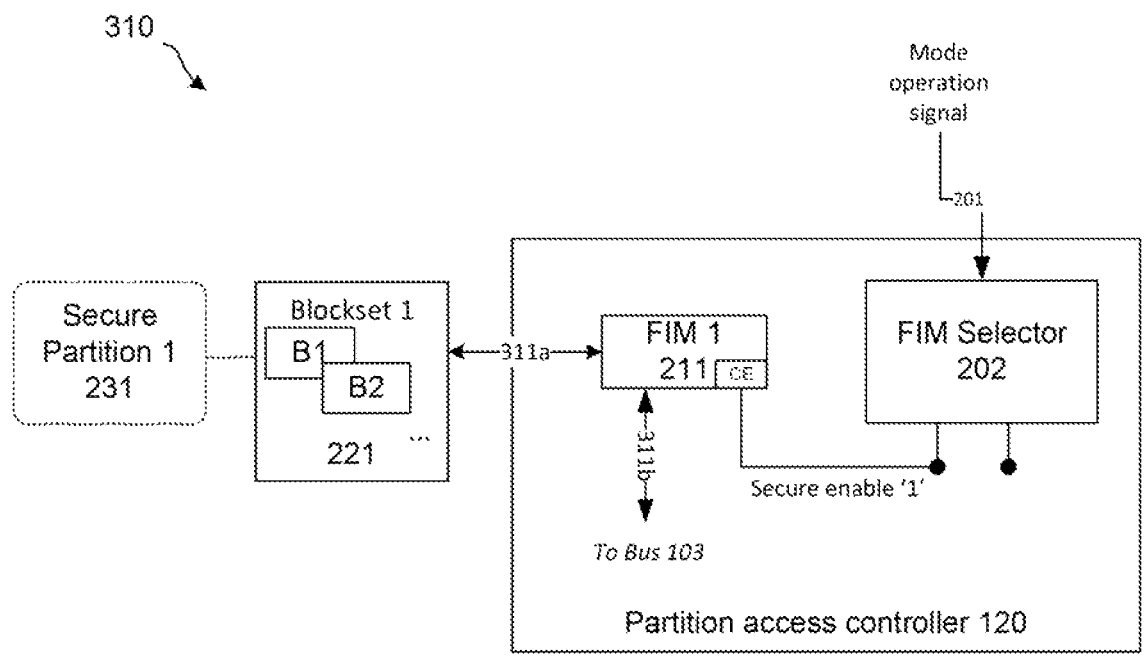
FIG. 3a illustrates a block diagram of a first example configuration of the partition access controller and the storage medium of the example DSD in accordance with some embodiments.

FIG. 3a illustrates an example configuration 310 of the PAC 120 for a DSD 100 in which the storage medium 108 is defined by a single secure partition 231. FIM selector 202 receives the mode operation signal 201 as input and processes the signal 201 to generate "secure enable" and "non-secure enable" output signals. The output signals of the FIM selector 202 connect to the control lines of the FIMs corresponding to blocksets of secure partitions and non-secure partitions respectively. In the single secure partition configuration shown in FIG. 3a, the secure enable output of the FIM selector 202 is connected to the chip-enable input of FIM 211. The non-secure enable output is not connected to a PAC 120 control line as there are no blocksets allocated to non-secure partitions.

In response to a transition to the secure mode, as indicated by the mode operation signal 201, the secure enable output is high (i.e., '1') such that FIM 1 (211) is activated. Activation of FIM 1 (211) results in a connection between physical memory blocks B1, B2, . . . of blockset 1 (corresponding to the secure partition) and the host 130, via the inclusion of blockset-to-FIM line 311a and FIM-to-bus line 311b in the data path 104.

In other embodiments, the partitions of the storage medium 108 include at least one non-secure partition (i.e., N>1, M≥1). In such embodiments, in response to the DSD 100 transitioning to the non-secure mode, the set of physical memory blocks of each non-secure partition is connected to the host 130 via the data path 104 (i.e., while the set of physical memory blocks of each secure partition is disconnected from the host 130 via the data path 104).

Figure 3B:
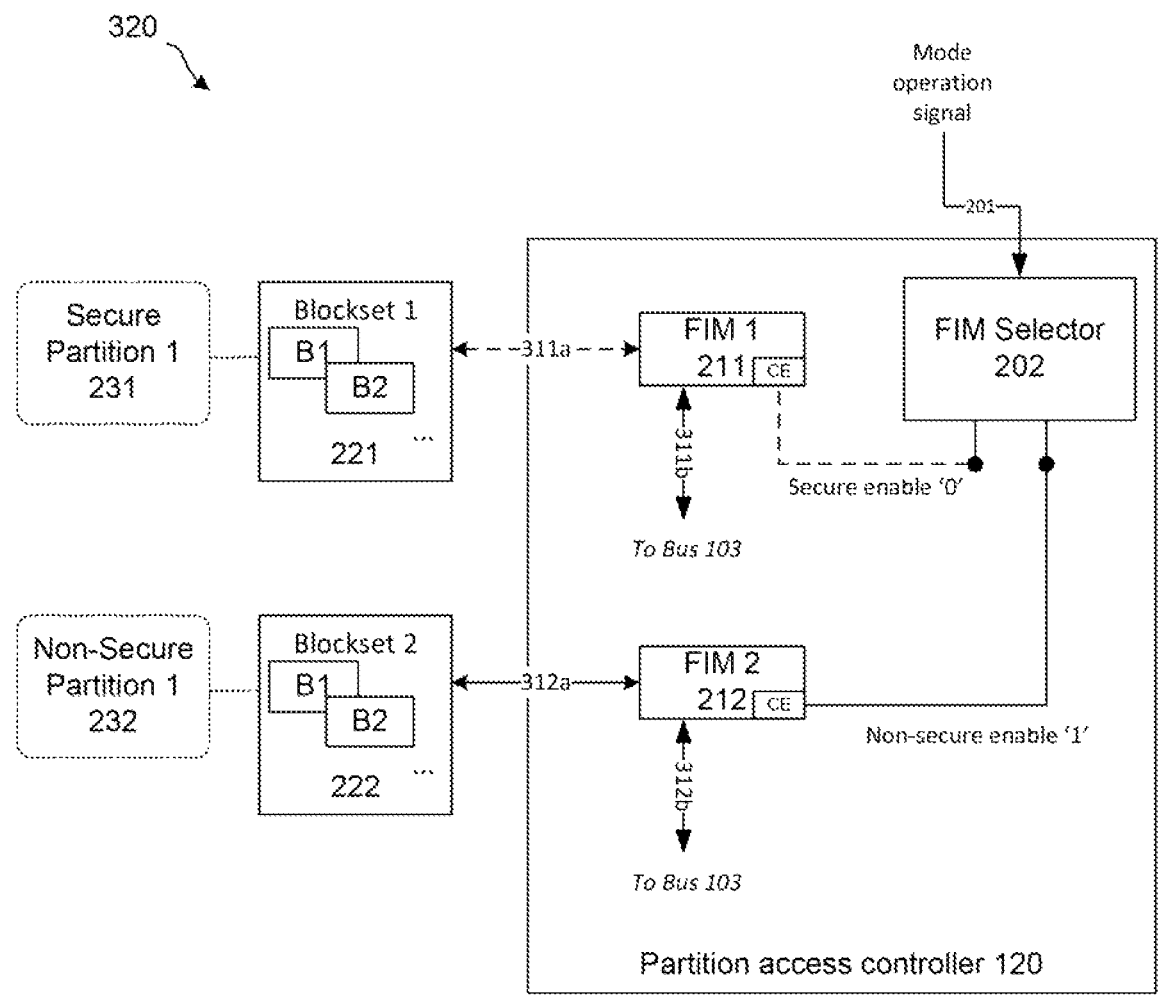
FIG. 3b illustrates a block diagram of a second example configuration of the partition access controller and the storage medium of the example DSD in accordance with some embodiments.

FIG. 3b illustrates an example configuration 320 of the PAC 120 for a DSD 100 in which the storage medium 108 is defined by a secure partition 231 and a non-secure partition 232 (i.e., N=2, K=1, M=1). The secure and non-secure enable output signals of the FIM selector 202 connect to the control lines of the FIMs corresponding to blocksets of secure partitions and non-secure partitions respectively. The secure enable output of the FIM selector 202 is connected to the chip-enable input of FIM 211, corresponding to blockset 1 (221) of the secure partition 231. The non-secure enable output is connected to the chip-enable input of FIM 212, corresponding to blockset 2 (222) of the non-secure partition 232.

In response to a transition to the non-secure mode, as indicated by the mode operation signal 201 input to the FIM selector 202, the non-secure enable output is high (i.e., '1') such that FIM 2 (212) is activated. Activation of FIM 2 (212) results in a connection between physical memory blocks B1, B2, . . . of blockset 2 (corresponding to the non-secure partition) and the host 130, via the inclusion of blockset-to-FIM line 312a and FIM-to-bus line 312b in the data path 104. Conversely, as the secure enable output signal is low (i.e., V0) the FIM 1 (211) is deactivated and blockset 1 (corresponding to the secure partition) is disconnected from the host 130 (since blockset-to-FIM line 311a and FIM-to-bus line 311b are excluded from the data path 104).

Figure 3C:
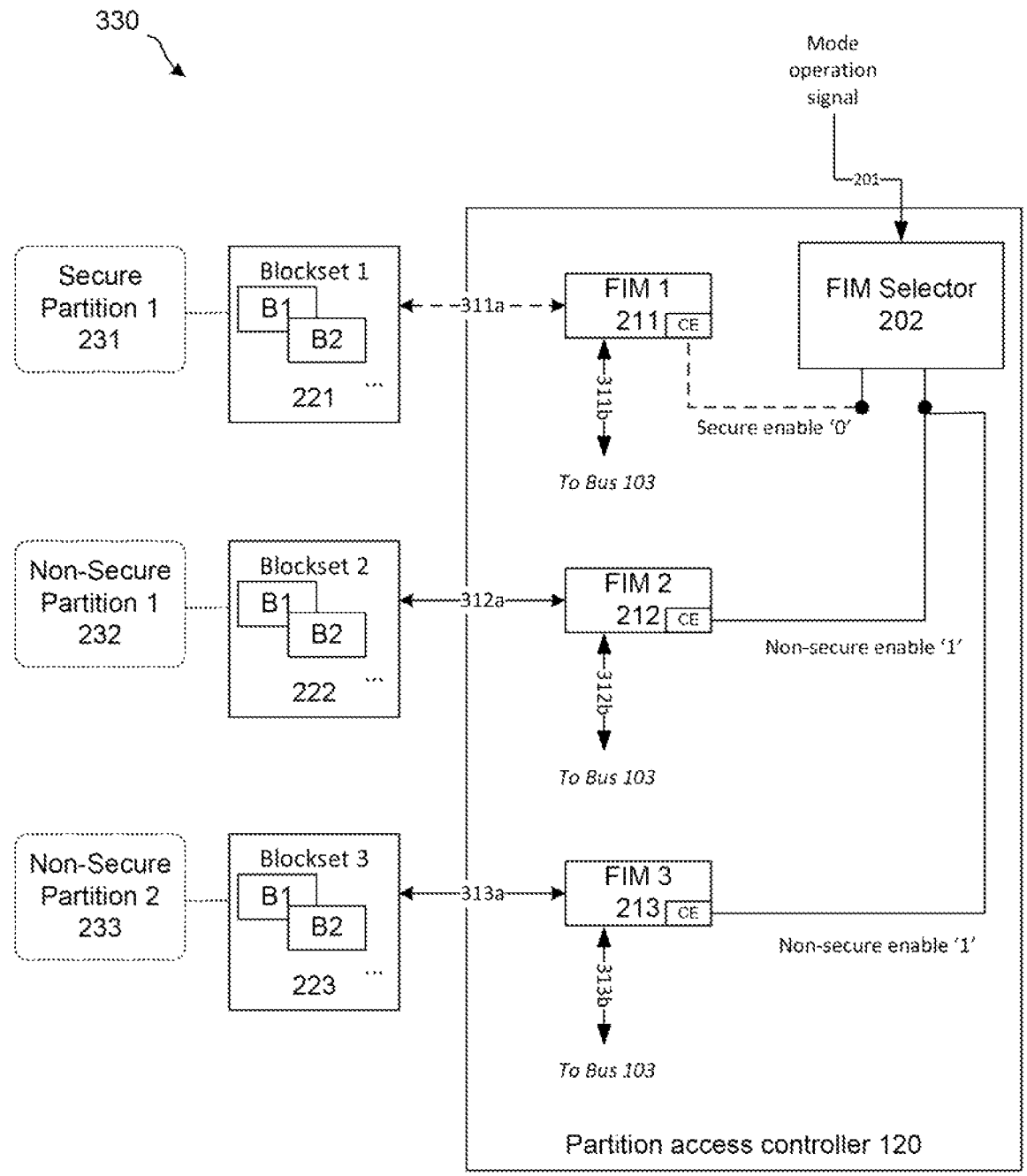
FIG. 3c illustrates a block diagram of a third example configuration of the partition access controller and the storage medium of the example DSD in accordance with some embodiments.

FIG. 3c illustrates an example configuration 330 of the PAC 120 for a DSD 100 in which the storage medium 108 is defined by a single secure partition 231 and two non-secure partitions 232, 233 (i.e., N=3, K=1, M=2). In response to a transition to the non-secure mode, as indicated by the mode operation signal 201 input to the FIM selector 202, the non-secure enable output is high (i.e., '1') such that FIM 2 (212) is activated. However, the non-secure enable output of the FIM selector 202 is also connected to the chip-enable line of FIM 3 (213) resulting in its activation. A connection between blocksets 2 and 3 (corresponding to the non-secure partitions 1 and 2) and the host 130 is achieved via the inclusion of blockset-to-FIM lines 312a, 313a and FIM-to-bus lines 312b, 313b in the data path 104. As for configuration 320 of FIG. 3b, FIM 1 (211) is deactivated and blockset 1 (corresponding to the secure partition) is disconnected from the host 130.

FIGS. 3b and 3c depict embodiments in which the connection and disconnection of blocksets corresponding to the secure and non-secure partition(s) is mutually exclusive since the logic of the FIM selector 202 generates opposing output enable signals for each possible mode operation signal 201 input. Switch 105 thereby provides a user 101 with functionality to toggle the accessibility of the secure and non-secure partitions to store and retrieve corresponding user content data (i.e., preventing both secure and non-secure user content data from being mutually physically accessible).

In other embodiments, the blocksets of the one or more non-secure partitions of the storage medium 108 are configured to remain connected to the host 130 via the data path 104 in response to a transition to the secure mode. In this case, the user 101 operates the switch 105 to permit and prevent access to the secure user content data stored thereon, while the blocksets of the non-secure partition(s) remain connected to the host 130. This configuration may be advantageous in providing an "always available" memory space (i.e., the non-secure partitions) enabling the DSD 100 to store and receive generic, or otherwise non-secure user content data, irrespective of whether the device 100 is operating in the secure mode.

In the described configurations, the collection of FIMs 211 to 21N of the PAC 120 form an interface between the bus 130 and the NAND memory blocksets 221 to 22N, where the flow of data through the device 100 is controlled by the one or more FIM chips that are active ("enabled") in the given operational mode. In some embodiments, the device controller 110 is configured to perform data access operations (i.e., reading and/or writing to the memspace) in parallel over the blocksets with corresponding FIMs that are presently enabled.

For example, in a storage medium configured with a single secure partition K=1 and M>1 non-secure partitions, the device controller 110 may be configured to operate the M non-secure FIMs in parallel such that data access operations are performed simultaneously on memory blocksets of each of the non-secure partitions. This enables the device 100 to treat the collection of non-secure partitions as a single logical memory space in order to improve data access performance. In some embodiments, the storage medium 108 is organized to have a plurality of secure partitions, and the device controller 110 may be configured to enable parallel access to the secure partitions alternatively, or in addition, to enabling parallel access to two or more of the non-secure partitions.

Enabling parallel access to the plurality of secure or non-secure partitions provides an increase in the data access performance of the DSD 100 compared to configurations in which access operations are sequentially performed on the individual partitions. The performance of the DSD for accessing secure or non-secure data, relative to a non-partitioned device, is proportional to the respective ratio of the number of secure or non-secure partitions against the total number of partitions. For example, the relative performance ratio of data accesses to non-secure partitions is given by $P_{non-secure}=(N-K)/N=M/N$ while the analogous performance ratio of data accesses to secure partitions is given by $P_{secure}=K/N$. This enables a vendor of the DSD to selectively set the number of secure and non-secure partitions such as to prioritize performance of data accesses in a particular operational mode (i.e., by increasing the parallelism devoted to accesses for one particular security mode over the other).

Figure 3D:
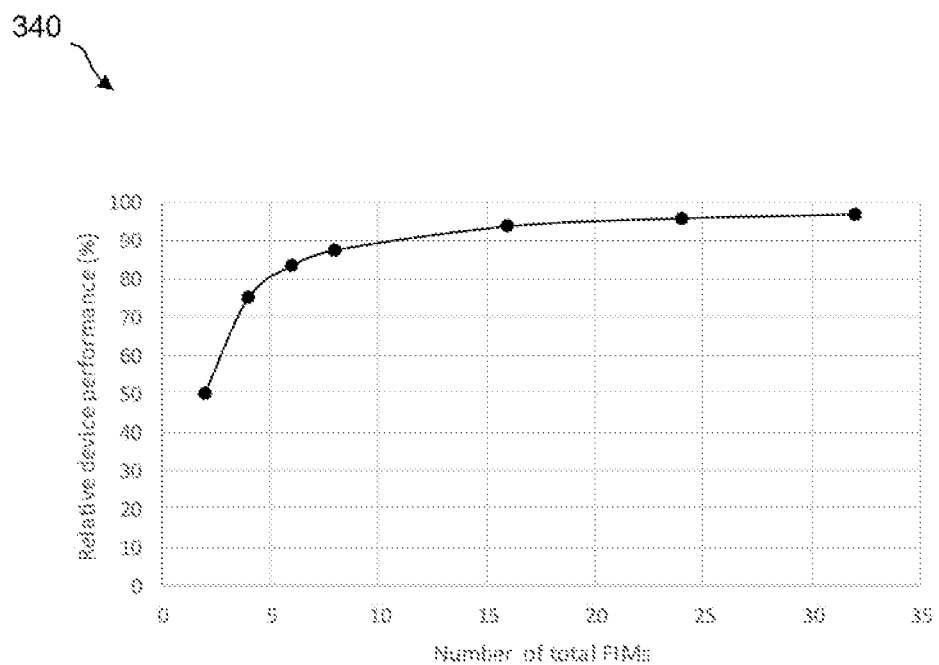
FIG. 3d illustrates a graph of the performance of the example DSD in accordance with some embodiments.

FIG. 3d is a graph 340 of the performance of a DSD 100 as a function of the number of total partitions of the memspace N and configured with a single secure partition K=1, and M=N−1 non-secure partitions. The results show that the performance of the DSD 100 is proportional to the number of non-secure partitions, such that configuring the medium 108 with N>8 (i.e., M>7) provides a data access performance level of at least 87.5% of that of a non-partitioned device.

Authenticated Switching Between Secure and Non-Secure Modes

In some embodiments, the DSD 100 may be configured to maintain an access state parameter, and to prevent any selective transition between the secure and non-secure modes based on the access state. The accesses state can bet set to a "locked" state, in which transitions of the operational mode of the DSD 100 are prevented (i.e., the DSD 100 is forced to remain in the secure mode or the non-secure mode), or an "unlocked" state in which transitions of the operational mode of the DSD 100 are permitted to occur (i.e., in response to an actuation of the switch 105).

In some embodiments, the device 100 is configured to only prevent a transition to the secure mode while the device 100 is in the locked state (i.e., while permitting a transition to the non-secure mode). That is, in such embodiments, the access state of the DSD 100 controls the accessibility of the secure partition(s) only. This is advantageous in enabling the device 100 to be set to the non-secure operational mode without requiring the device access state to be set to "unlocked".

For example, a user 101 may desire to transition the DSD 100 to the non-secure operational mode following the completion of their use of the secure partition(s) of the device 100 (e.g., as a type of 'log-off' activity), but without unlocking the device 100, which may require authentication (as described below) performing the transition (e.g., by actuating the switch 105), and then locking the device 100 again.

Prevention of operational mode transitions can occur at the hardware level by enabling or disabling the actuation of the switch 105. For example, in some embodiments the DSD 100 may be placed in the "locked" state by physically preventing any actuation of the switch 105 (e.g., by a mechanical mechanism that stops the cap of button switch 105 from reaching the depressed position). This prevents a transition of the DSD 100 between secure and non-secure operational modes by preventing the switch 105 from moving between the first and second positions. By contrast, in response to the DSD 100 being placed in the "unlocked" state the switch 105 is normally operable and is able to be actuated as a result of interaction by the user 101 (i.e., to cause a transition of the DSD 100 between secure and non-secure operational modes).

In other embodiments, the device controller 110 is configured to prevent or permit operational mode transitions of the DSD 100 based on the locked or unlocked state. In such embodiments, the device controller 110 may be configured to alter the mode operational signal 201 in response to an actuation of the switch 105 (e.g., a depression of a push button switch) only in the case that the access state of the DSD 100 is the unlocked state. The controller 110 ignores or disregards actuations of the switch 105 in the case that the access state of the DSD 100 is the locked state.

For example, the controller 110 may be configured to execute an operational mode control routine (e.g., from program code residing in the firmware 114b) that enables the device controller 110 to: receive an indication of the actuation of the switch 105; process the access state data (e.g., stored in system memory 114) to determine the access state of the device 100; and only in response to the access state of the device 100 being the unlocked state, generate a mode operation signal 201 to transition the operational mode of the device 100 and transmit the generated mode operation signal 201 to the PAC 120.

In some embodiments, the DSD 100 includes security mechanisms configured to enable transitions in the operational mode of the device 100 only in response to the authentication of the user 101 as an authorized user of the device 100. For example, the one or more input components 102 may be configured to receive authentication input from the user 101. The controller 110 processes the authentication input and provides an indication of whether the user 101 is an authorized user of the device 100. The DSD 100 is configured to assume the unlocked state only in response to the authentication of the user 101 as an authorized user.

The device controller 110 is configured to process the received authentication input and to determine a match to one or more known or pre-determined authentication values (e.g., the stored PIN codes, or fingerprint patterns of each authenticated user of the DSD 100). In response to a positive match, the controller 110 is configured to enable the actuation of the switch 105 (i.e., such that the user 101 can transition the operational mode of the device 100 by using the switch 105).

Encryption of Secure Partition User Content Data

Following the transition of the DSD 100 to the secure mode, the secure partition(s) of medium 108 are physically accessible for data retrieval and storage by the host 130. In some embodiments, encryption of the user content data stored on the secure partition is performed by the cryptography engine 107. The device controller 110 is configured to respond to a request by user 101 to store selected user content data on the at least one secure partition of the storage medium 108 by instructing the cryptography engine 107 to use an encryption key to perform an encryption function to encrypt the selected user content data, and store the encrypted selected user content data on at least one secure partition of the storage medium 108. The device controller 110 is configured to use a decryption key to perform a corresponding decryption function to decrypt encrypted user content data 109 stored on the secure partition(s) of the storage medium 108.

For example, the device controller 110 may be configured to provide a cryptographic key to the cryptography engine 107 enabling the cryptography engine 107 to encrypt the user content data "on the fly" as it passes through cryptography engine 107 from data port 106 to storage medium 108, and decrypts the encrypted user content data "on the fly" as it passes through the cryptography engine 107 from storage medium 108 to data port 106.

Figure 4:
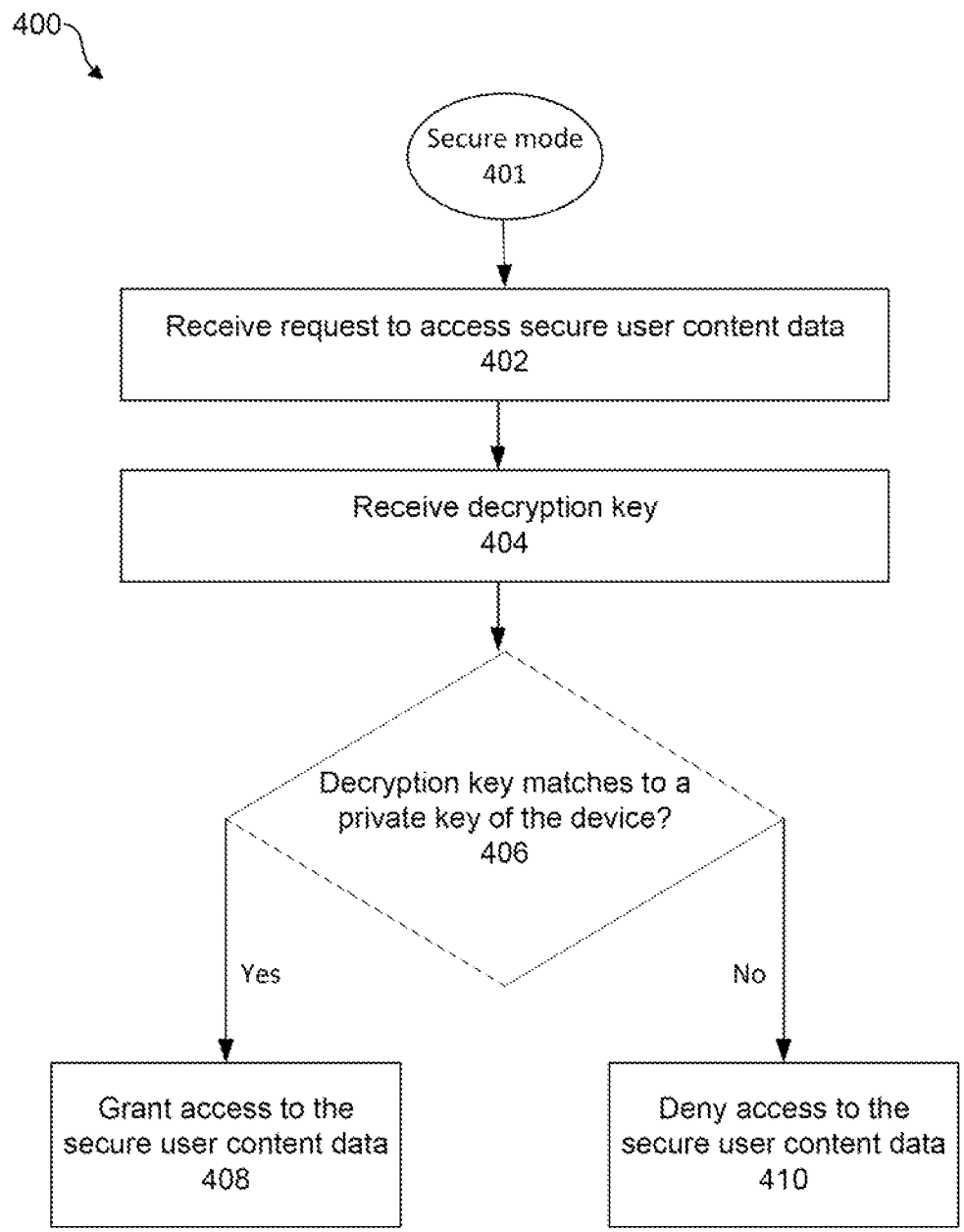
FIG. 4 illustrates a process by which a user accesses secure user content data of the example DSD in accordance with some embodiments.

The user 101 may logically access the secure partition(s) of the DSD 100, via host 130, following the activation of the secure partition(s) by a selective transition to the secure mode. FIG. 4 illustrates a process 400 by which the user 101 accesses the secure user content data of the DSD 100. The process starts at step 401 with the transition of the DSD 100 to the secure mode, thereby physically activating the memory blocks of the secure partition(s) to permit the possibility of logical access. At step 402, the DSD 100 receives a request by a user 101 (via host 130) to access user content data stored on one or more of the secure partitions of the storage medium 108 (the secure user content data).

At step 404, the device controller 110 receives a decryption key from a user 101 via the host 130. In some embodiments, the decryption key is received in response to a request sent by the controller 110 to the host 130 prompting the user 101 to enter the key (i.e., as a security check). The controller 110 may be configured to store the received decryption key in memory 114, thereby enabling a prior received decryption key to be used for future access requests by the same connected host 130 and/or user 101. For example, the device controller 110 may be configured to only request the decryption key on the first access request to the secure partition following the connection of the host 130 to the DSD 100.

At step 406, the device controller 110 determines whether the received decryption key matches to a private key of the DSD 100. The private key is stored in the system memory 114 of the controller 110. In some embodiments, the private key is set at a time prior to the first use of the DSD 100, such as during manufacturing and is hard-coded into memory 114. In other embodiments, the private key is user configurable enabling the user 101 to set a new private key arbitrarily or subject to completion of an authentication process (e.g., via a software utility executing on a connected host).

At step 408, in response to a match between the received decryption key and the private key of the DSD 100, the device controller 110 is configured to grant the user 101 access to the secure user content data by performing decryption of the data. In some embodiments, the decryption function is performed only on data specified in the access request. In some embodiments, the device controller 110 is configured to perform encryption and decryption of the secure user content data using a symmetric-key algorithm, such as for example Advanced Encryption Standard (AES) with a key size of 256 bits. In this case, the encryption key used to perform an encryption function to encrypt the secure user content data is the private key of the device 100.

In other embodiments, the device controller 110 may be configured to implement an asymmetric-key algorithm to logically protect the secure user content data. For example, a Public-Private key pair may be generated according to the RSA algorithm, where the encryption function is performed with the Public key. The Private key is supplied to authorized users of the DSD 100, enabling the user 101 to provide the Private as the decryption key during a request to access secure user content data (i.e., at step 404). The controller 110 is configured to store the Public-Private key pair in firmware 114b. Step 406 thereby proceeds by the controller 110 determining whether the decryption key matches to the Private key of asymmetric pair, and, in response to a match, then performing decryption of the data with the Private key.

Figure 5:
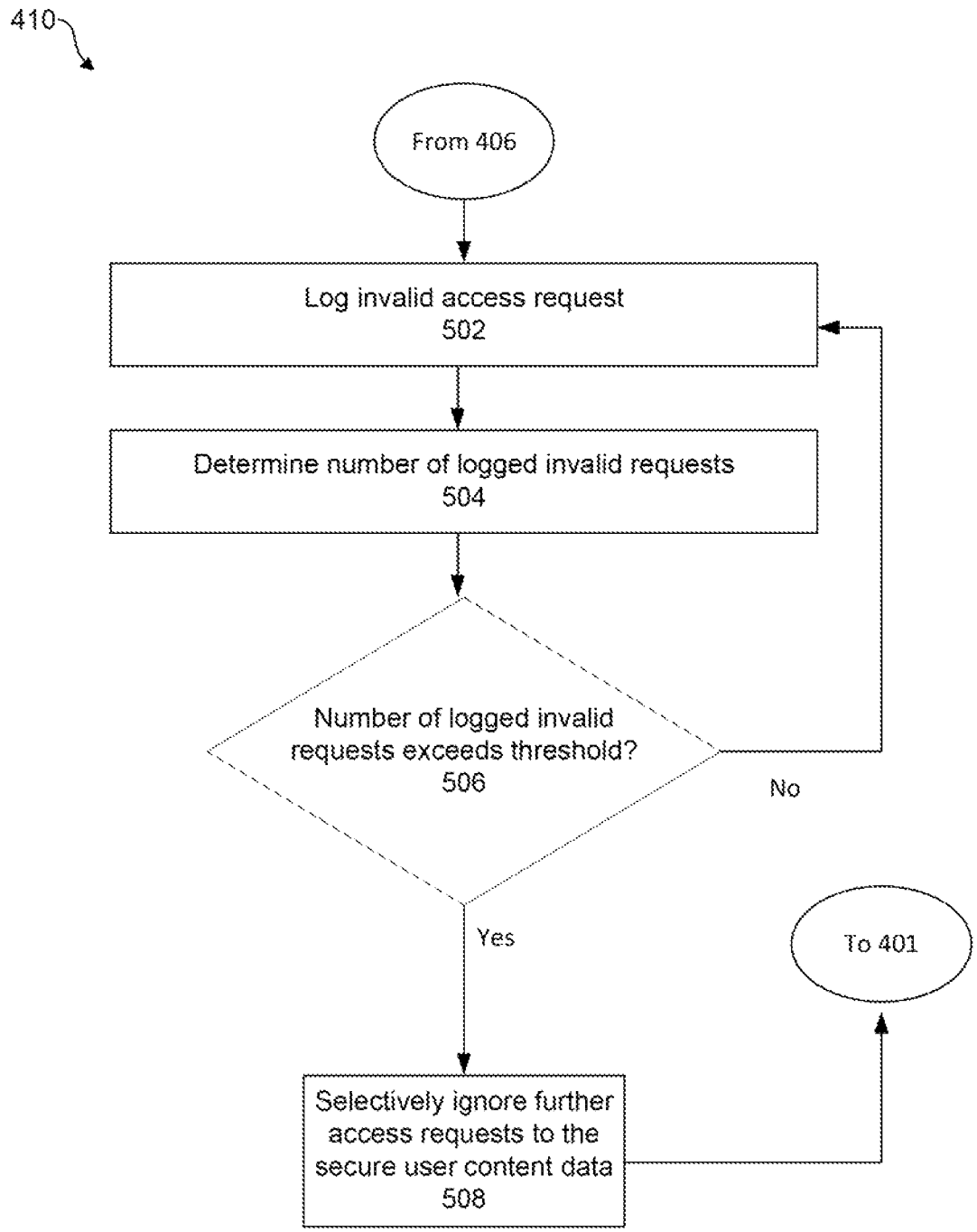
FIG. 5 illustrates a process by which a controller denies the user access to the secure user content data of the example DSD in accordance with some embodiments.

In response to the device controller 110 determining a deviation between the received decryption key and the private key of the DSD 100, the device controller 110 is configured to identify the access request as invalid and to subsequently deny the user 101 access to the requested secure user content data, at step 410. As shown in FIG. 5, in some implementations the controller 110 is configured to log the request by the user 101 to access the user content data 109 stored on the secure partition(s) as an invalid data access request (i.e., at step 502). The memory 114 stores data indicating a number of invalid access requests received by the DSD 100; and one or more access control event configuration parameters specifying functionality for responding to the invalid access requests. For example, the processor 111 logs the invalid access request by incrementing an integer value representing a running count of the logged invalid requests and updating the value in memory 114.

At step 504, the controller 110 determines an indication of a number of invalid access requests logged by the DSD 100. The determined number of invalid access requests may be determined over an access time interval, where the duration of the interval is determined by the configuration parameters. The processor 111 retrieves, from memory 114, the data value indicating the number of invalid requests I and a corresponding invalid request threshold $T_I$ from the configuration parameter set.

At step 506, the processor 111 compares the values of the counter data value) and threshold $T_I$. At step 508, in response to the number of invalid requests I exceeding the threshold value $T_I$, the controller 110 is configured to initiate a timeout routine in which the controller 110 selectively ignores further requests to access the secure user content data (i.e., the data stored on the secure partition(s) of the storage medium 108), until the occurrence of one or more access control events.

In some examples, the access control events include the lapsing of a pre-specified timeout period. For example, the processor 111 may be configured to retrieve an indication of the duration of the timeout period from the configuration parameters (e.g., 30 mins). The processor 111 determines an end time of the timeout period by adding the pre-specified duration to a timestamp value obtained on the determination that the number of invalid data access requests I exceeds the threshold value $T_I$. For the duration of the timeout period (i.e., until the determined end time is reached), the processor 111 is configured to drop or filter out access requests to secure user content data from the host 130 and/or user 101.

In other examples, the access control events include a validation or verification of the user 101. For example, the device controller 110 may be configured to prompt the user 101 to enter an authentication value, such as a PIN or passcode value, either via a software application executing on the host 130 or by interaction with the input components 102. The processor 111 verifies the received authentication value by comparison to a device reset value stored in firmware 114b, and validates the user 101 in response to determining a match of the values.

The device controller 110 is configured to restore the ability of the user 101 and/or host 130 to request access to the secure user content data (according to step 402) on the occurrence of the required access control event(s). The device controller 110 may be configured to implement validation and timeout period based access control events (i.e., such that the user 101 has the option of restoring the ability to request access to the secure user content data by validating, instead of being otherwise required to wait for the timeout period to expire).

With reference to FIG. 4, in an alternative implementation access to the secure user content data of the DSD 100 does not involve an explicit comparison between the decryption key received from the user 101 (i.e., at step 404) and a private key of the device 100. In such embodiments, instead at step 406 the device controller 110 is configured to perform the decryption function on the secure user content data with received decryption key to produce output (decrypted) data.

Following step 406, the decrypted data is returned to the user 101 via host 130. For secure user content data encrypted with a particular encryption key, the decrypted data returned to the user 101 is equal to the desired plain-form secure user content data only if the decryption and encryption keys are the same (in the case of a symmetric key algorithm), or if they form a key pair (in the case of an asymmetric key algorithm). Consequently, the user 101 is granted access to the secure user content data (step 408) only in response to the controller 110 receiving the correct decryption key. Otherwise, the user 101 is denied access to the secure user content data (step 410), since the decrypted data received is not the secure user content data. This is advantageous in that the decryption key does not need to be stored in the memory of the DSD 100 (for asymmetric key algorithms).

In a further modification, the controller 110 instructs the cryptography engine 107 to perform encryption for the secure user content data in the "on the fly" mode, and with an encryption key received in real-time from the user 101 issuing the command to store the data on the secure partition(s) (e.g., as provided by a software control utility executing on the host 130). This eliminates the need to store an encryption key or decryption key within the DSD 100, thereby eliminating the possibility of device security being compromised by an attack the system memory 114.

Figure 6:
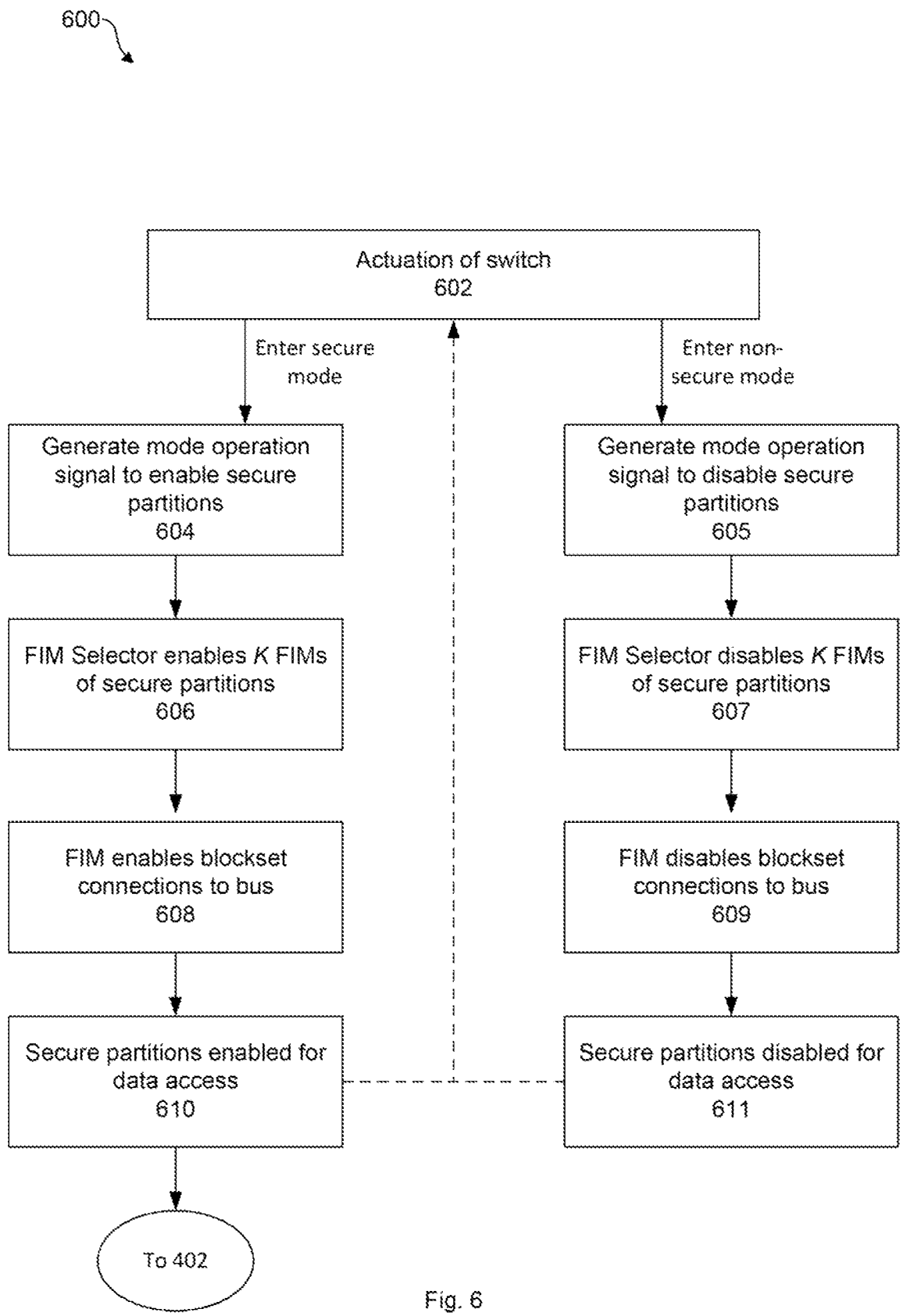
FIG. 6 illustrates a process by which the user utilizes the example DSD in accordance with some embodiments.

FIG. 6 illustrates a process 600 by which user 101 utilizes the DSD 100 according to the described two-step process of (i) physically connecting and disconnecting the secure partition(s) and (ii) in response to entering the secure mode, decrypting the secure user content data that is accessible from the secure partition(s). The DSD 100 is firstly connected to the host 130 via the data port 106. At step 602, the user 101 operates the DSD 100 to actuate the switch 105 (e.g., by manual interaction with the switch 105 components). Actuation of the switch 105 causes the DSD 100 to transition to the secure mode, from a default non-secure mode on connection with host 130. At step 604, the mode operation signal 201 is generated to represent the secure mode transition. The mode operation signal 201 may be generated by the switch 105 (e.g., by an connection of an electrical circuit) or by the device controller 110 in response to an indication of the actuation.

At step 606, the mode operation signal 201 is received by the PAC 120. FIM selector 202 processes the signal 201 to activate FIMs corresponding to flash memory blocksets of the secure partitions(s). At step 608, each of K individual FIMs of the secure partition blocksets enable blockset-to-FIM and FIM-to-bus line connections such that there is a data path connection between the respective blocksets and the host 130. At step 610, the corresponding logical spaces defining the secure partitions are able to be physically accessed, enabling the partitions for data access (i.e., read and write operations) by the host 130. Requests to access the secure user content data are received and processed according to the logical access control process 400 described above.

Following the entry of the secure mode, a repeated actuation of the switch 105, at step 602, causes the DSD 100 to transition to the non-secure mode. Steps 605, 607, 609 and 611 are corresponding operations performed by the DSD 100 to disconnect the flash memory blocks corresponding to the secure partition(s) of the storage medium 108, as described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:
1. A data storage device comprising:
a non-volatile storage medium configured to store user data, wherein:
the storage medium is organized as a plurality of partitions;
the plurality of partitions includes at least one secure partition; and
each partition of the plurality of partitions is defined by a corresponding set of pre-specified physical memory blocks of the storage medium;
a data path configured to provide data communication between a host computer system and the storage medium through a data bus of the data storage device;
a hardware switch configured to send a mode operation signal to partition controller circuitry; and the partition controller circuitry coupled to the hardware switch of the data storage device and comprising:
  a plurality of block control circuits, wherein each block control circuit of the plurality of block control circuits comprises:
    a set of interface sub-paths between that block control circuit and the corresponding set of pre-specified physical memory blocks for a corresponding partition of the plurality of partitions; and
    a set of bus sub-paths between that block control circuit and at least one path of the data bus; and
  a block selector circuit configured to, in response to an actuation of the hardware switch, cause the data storage device to selectively transition between:
    a secure mode by selectively enabling at least one block control circuit of the plurality of block control circuits corresponding to the at least one secure partition to electrically connect the corresponding set of interface sub-paths to the corresponding set of bus sub-paths for the set of pre-specified physical memory blocks of each secure partition; and
    a non-secure mode by selectively disabling the at least one block control circuit of the plurality of block control circuits corresponding to the at least one secure partition to electrically disconnect the corresponding set of interface sub-paths from the corresponding set of bus sub-paths for the set of pre-specified physical memory blocks of each secure partition.

2. The data storage device of claim 1, wherein the block selector circuit comprises a multiplexor circuit configured to:
  receive the mode operation signal from the hardware switch; and
  set, responsive to the mode operation signal indicating the secure mode, a circuit enable bit in each block control circuit corresponding to each secure partition.

3. The data storage device of claim 2, wherein:
  each set of pre-specified physical memory blocks includes one or more NAND flash memory blocks; and
  each block selector circuit is a Flash Interface Module (FIM) in a corresponding sub-path between the corresponding set of pre-specified physical memory blocks and the data bus.

4. The data storage device of claim 1, wherein:
  the plurality of partitions of the storage medium includes at least one non-secure partition; and
  in response to the data storage device transitioning to the non-secure mode, the set of pre-specified physical memory blocks of each non-secure partition is connected to the host computer system via the data bus.

5. The data storage device of claim 4, wherein, in response to the data storage device transitioning to the secure mode, the set of pre-specified physical memory blocks of each non-secure partition is disconnected from the data bus.

6. The data storage device of claim 4, wherein:
  the plurality of partitions of the storage medium includes at least two non-secure partitions; and
  the partition controller circuitry is further configured to enable parallel access to the at least two non-secure partitions.

7. The data storage device of claim 1, wherein:
  the block selector circuit is configured to process the mode operation signal to determine one or more block control circuits to enable; and
  the mode operation signal indicates the secure mode or the non-secure mode of the data storage device.

8. The data storage device of claim 1, wherein:
  the actuation of the hardware switch involves moving the hardware switch between a first position and a second position; and
  movement of the hardware switch causes the mode operation signal to toggle between a signal indicating the secure mode and a signal indicating the non-secure mode.

9. The data storage device of claim 1, wherein the data storage device is configured to:
  prevent any selective transition to the secure mode in response to the data storage device assuming a locked state; and
  enable any selective transition to the secure mode in response to the data storage device assuming an unlocked state.

10. The data storage device of claim 9, wherein the data storage device is configured to enable or prevent any selective transition to the secure mode by respectively enabling or disabling the actuation of the hardware switch.

11. The data storage device of claim 9, further comprises comprising:
  one or more input components configured to receive authentication input from a user; and
  device controller circuitry configured to:
    process the authentication input; and
    provide an indication of whether the user is an authorized user of the data storage device, wherein the data storage device assumes the unlocked state only in response to the authentication of the user as an authorized user of the data storage device.

12. The data storage device of claim 1, further comprising:
  a cryptography engine logically connected between a data port of the data storage device and the storage medium; and
  device controller circuitry configured to, following the selective transition of the data storage device to the secure mode, instruct the cryptography engine to use a decryption key to perform a decryption function to selectively decrypt encrypted user data stored on the at least one secure partition of the storage medium.

13. The data storage device of claim 12, wherein the device controller circuitry is further configured to respond to a request by a user to access user content data stored on the at least one secure partition of the storage medium by:
  receiving the decryption key from a user via the host computer system;
  determining whether the received decryption key matches a private key of the data storage device; and
  performing the decryption function in response to a match between the received decryption key and the private key of the data storage device.

14. The data storage device of claim 13, wherein, in response to determining that the received decryption key does not match to the private key of the data storage device, the device controller circuitry is further configured to:
  log the request by the user to access the user content data stored on the at least one secure partition as an invalid data access request;
  determine a number of invalid data access requests logged by the device controller circuitry over an access time interval; and in response to the number of invalid data access requests exceeding a threshold value, selectively ignore further requests to access the user content data stored on the at least one secure partition of the storage medium, until an occurrence of one or more access control events.

15. The data storage device of claim 14, wherein:
the one or more access control events include lapsing of a timeout period;
the timeout period commences at a time when the number of invalid data access requests exceeds the threshold value; and
the timeout period has a pre-specified duration.

16. The data storage device of claim 13, wherein the device controller circuitry is further configured to respond to a request by the user to store selected user content data on the at least one secure partition of the storage medium by:
instructing the cryptography engine to use an encryption key to perform an encryption function to encrypt the selected user content data; and
storing the encrypted selected user content data on the at least one secure partition of the storage medium.

17. The data storage device of claim 16, wherein the encryption key is the private key of the data storage device.

18. A method for securing user content data of a data storage device, the method executed by a controller of the data storage device and comprising:
determining a first actuation of a hardware switch of the data storage device;
selectively enabling, in response to the first actuation of the hardware switch and using a block selector circuit, at least one block control circuit corresponding to at least one secure partition to electrically connect a corresponding set of interface sub-paths for the at least one block control circuit to a corresponding set of bus sub-paths for the at least one block control circuit to initiate a secure mode in which a set of pre-specified physical memory blocks of the at least one secure partition is electrically connected to a data bus of the data storage device;
determining a second actuation of the hardware switch of the data storage device; and
selectively disabling, in response to the second actuation of the hardware switch and using the block selector circuit, the at least one block control circuit corresponding to the at least one secure partition to electrically disconnect the corresponding set of interface sub-paths for the at least one block control circuit from the corresponding set of bus sub-paths for the at least one block control circuit to initiate a non-secure mode in which the set of pre-specified physical memory blocks of the at least one secure partition is electrically disconnected from the data bus of the data storage device, wherein:
the user content data is stored within a non-volatile storage medium of the data storage device;
the storage medium is organized as a plurality of partitions including the at least one secure partition;
each of the plurality of partitions is defined by a corresponding set of pre-specified physical memory blocks of the storage medium;
the block selector circuit is connected to a plurality of block control circuits including the at least one block control circuit;
each block control circuit of the plurality of block control circuits comprises:
a set of interface sub-paths between that block control circuit and the corresponding set of pre-specified physical memory blocks for a corresponding partition of the plurality of partitions; and
a set of bus sub-paths between that block control circuit and at least one path of the data bus;
in the secure mode, the set of physical memory blocks of each secure partition is connected to a host computer system via a data path providing data communication between the host computer system and the storage medium of the data storage device; and
the data path comprises the data bus of the data storage device configured to selectively connect to the sets of pre-specified physical memory blocks.

19. The method of claim 18, further comprising, in response to selectively transitioning the data storage device to the secure mode, responding to a request by a user to access user content data stored on the at least one secure partition of the storage medium by:
receiving a decryption key from the user via the host computer system;
determining whether the received decryption key matches a private key of the data storage device; and
performing the decryption function in response to a match between the received decryption key and the private key of the data storage device.

20. A data storage device comprising:
a non-volatile storage medium configured for storing user data, wherein:
the non-volatile storage medium is organized as a plurality of partitions;
the partitions include at least one secure partition; and
each of the plurality of partitions is defined by a corresponding set of pre-specified physical memory blocks of the non-volatile storage medium;
a data path configured for providing data communication between a host computer system and the non-volatile storage medium through a data bus of the data storage device;
a hardware switch configured to generate a mode operation signal;
a plurality of block control means, wherein each block control means of the plurality of block control means comprises:
a set of interface sub-paths between that block control means and the corresponding set of pre-specified physical memory blocks for a corresponding partition of the plurality of partitions; and
a set of bus sub-paths between that block control means and at least one path of the data bus; and
means for selectively transitioning, responsive to the mode operation signal, the data storage device between:
a secure mode by selectively enabling at least one block control means of the plurality of block control means corresponding to the at least one secure partition to electrically connect the corresponding set of interface sub-paths to the corresponding set of bus sub-paths for the set of physical memory blocks of each secure partition; and
a non-secure mode by selectively disabling the at least one block control means of the plurality of block control means corresponding to the at least one secure partition to electrically disconnect the corresponding set of interface sub-paths from the corresponding set of bus sub-paths for in the set of physical memory blocks of each secure partition.

* * * * *